United States Patent [19]
Kennedy, Jr. et al.

[11] 3,945,590
[45] Mar. 23, 1976

[54] SEMI-AUTOMATIC TAKEOFF CONTROL SYSTEM FOR AIRCRAFT

[75] Inventors: Thomas W. Kennedy, Jr., Phoenix; Harry D. Smith, Scottsdale, both of Ariz.

[73] Assignee: Sperry Rand Corporation, New York, N.Y.

[22] Filed: Jan. 23, 1975

[21] Appl. No.: 543,210

[52] U.S. Cl......... 244/77 A; 73/178 T; 235/150.22; 244/77 D; 318/584; 244/77 SE
[51] Int. Cl.²........................................ B64C 13/18
[58] Field of Search............. 73/178 T; 235/150.22; 244/77 A, 77 D, 77 F, 77 SE; 318/583, 584

[56] References Cited
UNITED STATES PATENTS

| | | | |
|---|---|---|---|
| 3,313,152 | 4/1967 | Kulda et al.......................... | 73/178 T |
| 3,435,674 | 4/1969 | Sleight et al..................... | 244/77 A X |
| 3,455,160 | 7/1969 | Sleight............................... | 73/178 T |
| 3,848,833 | 11/1974 | Rauschelbach................... | 244/77 D |

*Primary Examiner*—Trygve M. Blix
*Assistant Examiner*—Stephen G. Kunin
*Attorney, Agent, or Firm*—Howard P. Terry; Albert B. Cooper

[57] ABSTRACT

A semi-automatic takeoff flight control system for automatically capturing a predetermined takeoff pitch attitude at a predetermined pitch rate during the aircraft takeoff rotation maneuver. In response to the manual rotation command from the pilot, control circuitry generates a pitch rate command to the elevator, limited to the predetermined pitch rate. As the craft rotates to an intermediate pitch attitude less than the desired predetermined takeoff climb attitude, circuitry is included to provide a pitch attitude command with regard to the predetermined reference attitude, which by virtue of rate, displacement, and integral control provides asymptotic capture of the predetermined reference attitude.

8 Claims, 1 Drawing Figure

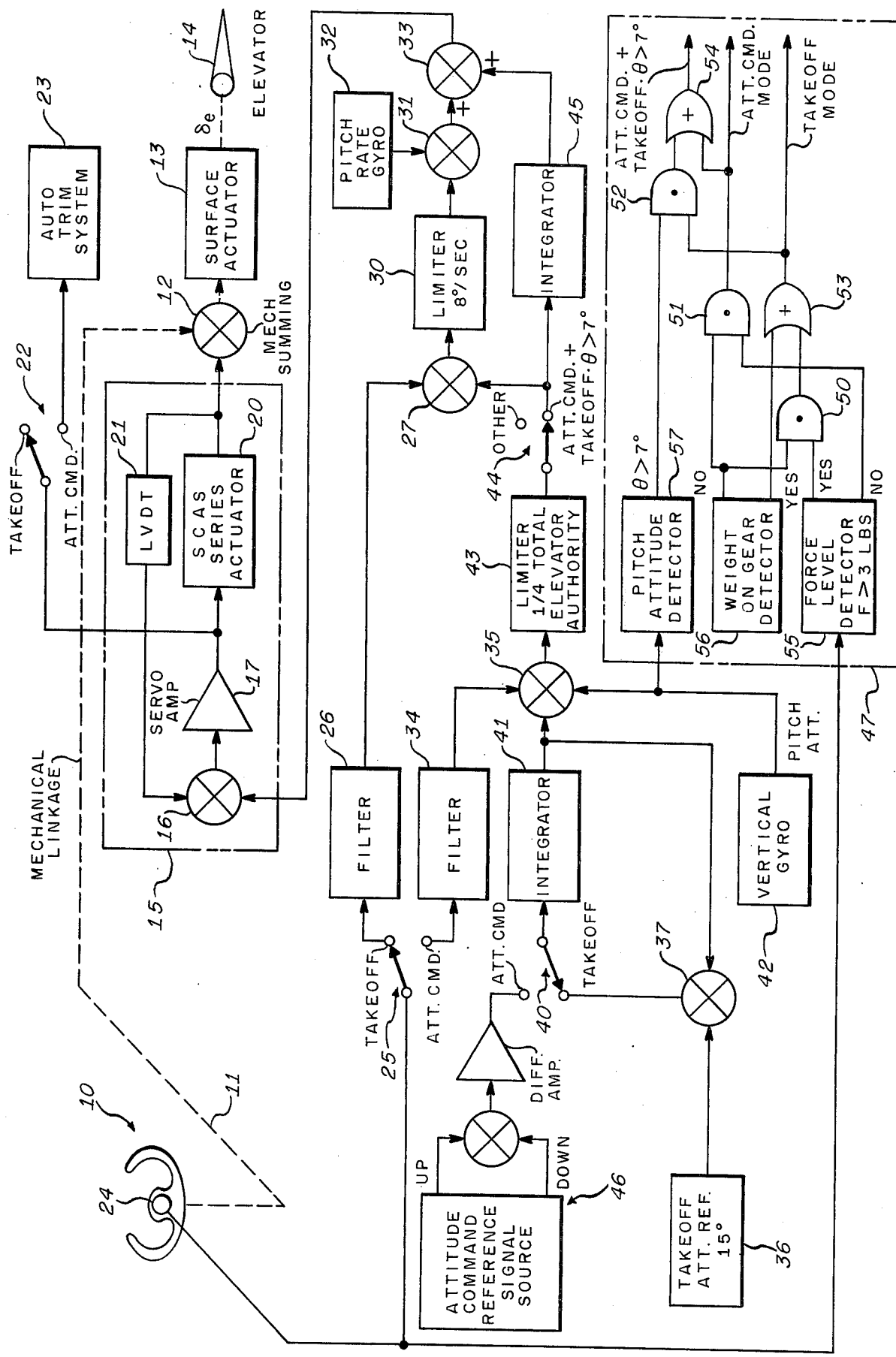

SEMI-AUTOMATIC TAKEOFF CONTROL SYSTEM FOR AIRCRAFT

BACKGROUND OF THE INVENTION

1. Field of the Invention

The invention relates to flight control systems, particularly with regard to the takeoff mode thereof.

2. Description of the Prior Art

In modern aircraft requiring a takeoff run to become airborne, the pilot applies a pitch-up command to the control column when the aircraft attains a predetermined forward velocity, designated as the rotation velocity $V_R$. The manual command from the pilot rotates the craft about the main gear so as to increase the angle of attack thus lifting the craft from the runway. To achieve specified takeoff performance, the manual command must be precisely applied to rotate the craft at a predetermined pitch rate to asymptotically capture a predetermined climb-out pitch attitude.

In most aircraft, this maneuver requires complete pilot attention and a nominal degree of pilot skill. In other aircraft, particularly the short takeoff and landing variety, hereinafter referred to as STOL aircraft, the maneuver is critical with regard to aircraft safety. In STOL aircraft, because of the narrow stall margin configurations thereof, the pilot must precisely command a high maximum pitch rate and capture the predetermined climb-out pitch attitude with no overshoot thereof. In the STOL aircraft, over-rotation causes excessive angle of attack and the attendant lack of forward acceleration; conversely, under-rotation causes the aircraft to become airborne beyond the designated takeoff point. Thus, in the short runway STOL environment, it is clear that the takeoff maneuver must be precise or the aircraft will over-run the runway surface without having become airborne. This maneuver is difficult to manually execute through elevator control because of the lack of adequate guidance information and the high forces and large elevator deflections required. Even with an elevator boost system which reduces the required force inputs, the rotation maneuver is difficult to perform precisely. With such aircraft, pilots tend to vary the pitch rate in an attempt to hunt for and seek the required pitch attitude. Such maneuvering is considered to be dangerous because of the aforementioned narrow stall margin configuration of such STOL aircraft.

SUMMARY OF THE INVENTION

With the present invention, the pilot is merely required to apply such stick force as to approximate the precise maneuver. When the pilot applies the manual rotation command, circuitry is utilized to provide a pitch rate command to the elevator limited to the desired maximum pitch rate. Thus, pitch rates that would result in an overshoot or undershoot of the desired pitch climb out attitude are not developed. When the aircraft achieves an intermediate attitude less than the desired climbout attitude, circuitry is utilized in an attitude hold mode with regard to a reference source for the predetermined climbout attitude for asymptotically capturing the desired attitude.

BRIEF DESCRIPTION OF THE DRAWING

The sole FIGURE is a schematic block diagram of a flight control system configured in accordance with the present invention.

DESCRIPTION OF THE PREFERRED EMBODIMENT

The present invention is applicable to a wide variety of aircraft types and to a wide variety of flight control systems. The invention will be explained in terms of a stability and command augmentation system (SCAS) for a STOL aircraft with particular characteristics. The system to be described will rotate the aircraft in response to an appropriate manual pitch-up command from the pilot at a maximum rate of 8° per second to asymptotically capture a climb-out pitch attitude of +15° so as to provide the shortest takeoff distance.

Referring to the sole FIGURE, a schematic block diagram of a pitch axis SCAS incorporating the takeoff control features of the present invention is illustrated. A manual controller 10, such as a conventional control wheel and control column arrangement, is coupled via appropriate mechanical linkages 11 to a mechanical summing device 12 to provide manual pitch commands from the pilot. The output of the mechanical summing device 12 is applied to a main surface actuator 13 which, in turn, positions elevator control surfaces 14 of the aircraft. The surface actuator 13 may comprise any of a wide variety of conventional full authority actuator systems such as electrically controlled or hydraulic boost actuators or the like. It is appreciated that the surface actuator 13 may also comprise a suitable direct mechanical linkage from the mechanical summing device 12 to position the elevator 14.

A second input to the mechanical summing device 12 is provided by a conventional SCAS servo 15. The SCAS servo 15 includes a summing junction 16 whose output is applied through a servo amplifier 17 to drive a SCAS series actuator 20. The SCAS actuator 20 is designed to provide limited authority of one-half of the total elevator authority. The actuator 20 may be of a conventional type as described in U.S. Pat. Nos. 3,213,702 and 3,269,199, both by L. W. Deenan et al., issued Oct. 26, 1965 and Aug. 30, 1966, respectively, entitled "Jackscrew" and "Motion Converting Mechanism", respectively, and both assigned to the assignee of the present invention; or it may be a conventional electro-hydraulic secondary actuator such as shown in U.S. Pat. No. 2,936,135. The output of the actuator 20 is applied as an input to the mechanical summing device 12 and is also applied via an actuator position feedback transducer 21 to provide an input to the summing junction 16 to close the positioning servo loop 15. The output of the servo amplifier 17 is also applied through a two-position switch 22 to actuate a conventional automatic trim system 23. In the takeoff position of the switch 22, the SCAS servo 15 is disconnected from the trim system 23 and in the attitude command position thereof the SCAS servo 15 is connected thereto. The switch 22 is positioned in accordance with logic to be later described.

A stick force sensor 24 mounted in the control wheel 10 provides a signal proportional to the force applied to the wheel 10 by the human pilot in manually commanding a pitch maneuver. The sensor 24 is a mechanical to electrical transducer and of the type described in U.S. Pat. No. 3,703,267 by K. L. Oliver entitled "Control Wheel Force Sensors", issued Nov. 21, 1972 and assigned to the assignee of the present invention. The output of the stick force sensor 24 is applied to the wiper of a two-position switch 25 which is positioned with the switch 22 in a manner to be explained. With the switch 25 in the takeoff position, the stick force sensor 24 is connected through a shaping filter 26 as an input to a summing junction 27. The shaping and filtering required for the signal of the stick force sensor 24 as provided by the filter 26 is well known in the flight control art and will not be further described herein for brevity.

The output of the summing junction 27 is applied as an input to a rate limiter 30. The limiter 30 is a conventional circuit that provides an output signal proportional to its input up to a predetermined limit, the limit being set so that the maximum command to the SCAS servo 15 results in an aircraft pitch rate of 8° per second. The output of the limiter 30 is applied as an input to a summing junction 31 which receives as an other input a pitch rate signal from a pitch rate gyro 32. The output from the summing junction 31 is applied as an input to a summing junction 33 whose output is, in turn, applied as an input to the summing junction 16 of the SCAS servo 15. Thus it is appreciated that when the human pilot applies, for example, a pitch-up command to the control wheel 10, the elevator 14 is deflected through the mechanical linkage 11, the mechanical summing device 12 and the main actuator 13 in proportion to the manual pitch command. Additionally, the command is augmented by a signal from the stick force sensor 24 through the limiter 30 to the SCAS servo 15 and hence to the main surface actuator 13 through the mechanical summing device 12. Because of the input from the pitch rate gyro 32 to the summing junction 31, the aircraft responds with a pitch rate proportional to the signal provided by the stick force sensor 24 when the stick force signal is operating within the proportional region of the limiter 30. When the signal from the stick force sensor 24 equals or exceeds the value determined by the limiter 30, the aircraft is constrained to a maximum pitch rate of 8° per second by said limiter 30.

With the switch 25 in the attitude command position, the output of the stick force sensor 24 is applied through a shaping filter 34 as an input to a summing junction 35. The filter 34 may have similar well known characteristics to those of the filter 26 and, in fact, may be identical thereto. It will be appreciated therefore that the filters 26 and 34, when identical, may be replaced by a single filter upstream of the switch 25.

A takeoff attitude reference source 36 is included that provides a fixed signal to control the aircraft precisely to a pitch attitude of 15°. The output of the reference source 36 is applied as an input to a summing junction 37 whose output is, in turn, applied through the takeoff contact of a two-position switch 40 as the input to an integrator 41. The switch 40 is simultaneously controlled with the switches 22 and 25 in a manner to be explained. The output of the integrator 41 is applied as an input to the summing junction 35 as well as an input to the summing junction 37. When the switch 40 is in the takeoff position, the integrator 41 is connected through the summing junction 37 in a follow-up configuration to thereby assume the 15° reference potential from the source 36. Also applied as an input to the summing junction 35 is a pitch attitude signal from a vertical gyroscope 42. Thus, with the switches 25 and 40 in the take-off position, the output signal from the summing junction 35 is a pitch attitude error signal representative of the difference between the actual craft pitch attitude and the reference attitude of 15°.

The output of the summing junction 35 is applied through a limiter 43 to a two-position switch 44. The limit values for the limiter 43 are set to command a maximum of one-quarter of the total elevator authority to preclude hard-over elevator commands in the event of a failure in the pitch attitude command provided by the summing junction 35 and the components upstream therefrom. The switch 44 is positioned in a manner to be described in detail hereinafter by logic signals as indicated by the legends associated therewith. The switch 44 is positioned as illustrated in the drawing when the system is in the attitude command mode or is in the take off mode with a pitch attitude of greater than 7°. When other logical conditions exist, the switch 44 is in the position opposite to that illustrated in the figure. Such other position may be controlled in accordance with the system being in, for example, a rate command mode or an altitude hold mode or in the take off mode with a pitch attitude of less than 7°. When the switch 44 is in the position illustrated in the figure, the pitch attitude command from the limiter 43 is applied as an input to the summing junction 27 and hence through the limiter 30 to control the SCAS servo 15. It is appreciated that the pitch attitude command signals applied from the limiter 43 cannot result in a pitch rate greater than 8° per second by reason of the limiter 30.

The pitch attitude command applied from the limiter 43 through the switch 44 to the summing junction 27 is also applied through an integrator 45 as an input to the summing junction 33 to provide pitch attitude integral control in a well known manner.

The system also includes a conventional manual pitch attitude reference command controller 46, the output of which is applied to the attitude command contact of the switch 40. Such pitch command controllers are well known in the art and may be instrumented by a conventional manual pitch attitude "beep" controller, usually mounted on the pilot's control wheel.

The switches 22, 25, 40 and 44 are positioned by logic circuit 47 via any convenient coupling means (not shown). The logic circuit 47 is comprised of AND gates 50, 51 and 52 as well as OR gates 53 and 54. A force level detector 55 coupled to receive the signal from the stick force sensor 24 provides logic signals to the logic circuit 47 when the pitch command force applied by the pilot to the control wheel 10 is greater than three pounds or is not greater than three pounds as indicated by the legends. A weight on gear detector 56 applies logic signals to the logic circuit 47 when the weight of the aircraft is on the gear or when the weight of the aircraft is off the gear, i.e. when the aircraft is not or is airborne, respectively. A pitch attitude detector 57 coupled to the pitch attitude output of the vertical gyroscope 42 provides a logic signal to the logic circuit 47 when the pitch attitude of the aircraft exceeds 7°.

The logic circuit 47 implements the following logic expressions:

$$\text{Take Off Mode} = \text{wt-on-gear} + \overline{\text{wt-on-gear}} \cdot F > 3 \text{ lbs.} \qquad (1)$$

$$\text{Att Cmd Mode} = \overline{\text{wt-on-gear}} \cdot F < 3 \text{ lbs.} \qquad (2)$$

$$\text{Att Cmd} + \text{Take Off} \cdot \theta > 7° \qquad (3)$$

where equation (1) represents the output of the OR gate 53, equation (2) represents the output of the AND gate 51 and expression (3) represents the output of the OR gate 54. Thus it is appreciated that the logic output signal from the OR gate 53 positions the switches 22, 25 and 40 to the respective contacts designated by the take off legend and the logic output signal from the AND gate 51 positions these switches to the respective attitude command contacts. In a similar manner the output of the Or gate 54 positions the switch 44 to the contact designated by the legend associated with the gate 54 and logic circuitry not shown positions the switch 44 to the other contact when the logic conditions designated by the legend associated with the gate 54 are not satisfied.

In operation, when the aircraft is in the take off run and consequently since the weight is on the gear, the logic circuit 47 positions the switches 22, 25 and 40 to the take off contact and since the pitch attitude is not greater than 7°, the switch 44 is positioned to the "other" contact. When the aircraft attains the rotation velocity, the pilot applies back pressure to the control wheel 10 of an approximate amount to endeavor to rotate the aircraft to a 15° attitude. Since the switch 44 is open, the elevator 14 is deflected in accordance with the direct mechanical signal from the mechanical linkage 11 and the signal from the stick force sensor 24 through the shaping filter 26 and the limiter 30 to the SCAS servo 15. Because of the rate limit established by the limiter 30 and the pitch rate aerodynamic feedback through the pitch rate gyro 32, the craft is constrained to pitch up at a rate not exceeding 8° per second. When the craft becomes airborne, since the force applied to the control wheel 10 is greater than 3 pounds, the system remains in the take off mode. When the aircraft exceeds a pitch attitude of 7°, the logic circuit 47 closes the switch 44 thus applying a pitch attitude command to the SCAS servo 15 in accordance with the 15° reference signal stored in the integrator 41. The system then controls the craft to reduce the difference between the pitch attitude signal from the vertical gyroscope 42 and the reference signal stored in the integrator 41 so that the aircraft approaches the desired 15° climb out attitude. The respective gains of the displacement path through the limiter 30, the rate path through the pitch rate gyroscope 32 and the integral path through the integrator 45 are adjusted in a well known manner such that the aircraft asymptotically approaches the desired 15° pitch attitude.

When the aircraft attains the desired climbout attitude, the pilot releases the force on the control wheel 10 thus causing the system to enter the attitude command mode. In this mode the switches 22, 25 and 40 are positioned to the attitude command contacts, respectively, and the switch 44 remains in the position illustrated. Thus it is appreciated that the system is then operating in a conventional attitude command configuration where craft attitude control is effected by the control wheel 10 or the pitch reference beep command 46 with stability and command augmentation provided by the SCAS system as illustrated. It is appreciated that when the system is in the attitude command mode the automatic trim system 23 operates in a conventional manner to maintain the limited authority SCAS series actuator 20 toward the central portion of its authority region.

It will be appreciated that although the preferred embodiment of the invention was explained in terms of specific parameters such as pitch rate limited to 8° per second to approach a pitch attitude of 15° and an intermediate pitch attitude of 7°, which parameters were chosen for a particular STOL aircraft, other pitch attitudes and pitch rates may be selected in accordance with the characteristics of the aircraft for which the system is designed. Similarly pilot control wheel forces other than 3 pounds may be utilized in effecting control in the system and alternatively a control wheel displacement sensor may be utilized to the same effect. The above described embodiment of the invention was explained in terms of a limited authority SCAS series actuator. The concepts of the present invention are equally applicable to full authority parallel actuator control systems.

From the foregoing it will be appreciated that when the aircraft attains the rotation velocity $V_R$, the pilot is required merely to apply normal up elevator force and to thereafter provide only approximately the correct elevator force for the aircraft to precisely capture and hold the reference pitch attitude. The system as described automatically establishes the desired pitch rate to asymptotically capture the desired climb out pitch attitude.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A semi-automatic take off control system for aircraft for rotating said aircraft at no greater than a maximum predetermined pitch rate to capture a predetermined climb pitch attitude in response to a manual rotation command, comprising
   first control means including limiter means responsive to said manual rotation command for rotating said aircraft at a pitch rate no greater than said maximum predetermined pitch rate,
   detector means for detecting an intermediate pitch attitude less than said predetermined climb pitch attitude,
   reference source means for providing a reference signal representative of said predetermined climb pitch attitude, and
   second control means responsive to said detector means and said reference source means for controlling said aircraft to capture said predetermined climb pitch attitude after said aircraft attains said intermediate pitch attitude.

2. The system of claim 1 in which said aircraft includes
   pitch control surface means,
   main surface actuator means coupled to said surface to control the positioning thereof,
   manual pitch control column means for applying said manual rotation command, and
   linkage means coupling said control column means to said main actuator means for coupling said manual rotation command thereto.

3. The system of claim 2 in which
   said control column means includes a mechanical to electrical transducer for providing an electrical pitch command signal in accordance with said manual rotation command, and
   said first control means comprises servo means including a series actuator coupled to said surface to control the positioning thereof, said mechanical to electrical transducer being coupled through said limiter means to said servo means, thereby rotating said aircraft at a pitch rate no greater than said maximum predetermined pitch rate in response to said manual rotation command.

4. The system of claim 3 in which said second control means comprises
pitch attitude sensor means for providing a pitch attitude signal representative of the pitch attitude of said aircraft,
combining means for combining said pitch attitude signal with said reference signal to provide a pitch attitude error signal, and
switch means responsive to said detector means for coupling said pitch attitude error signal through said limiter means to said servo means when said aircraft attains said intermediate pitch attitude,
thereby controlling said aircraft to capture said climb pitch attitude at a pitch rate no greater than said maximum predetermined pitch rate.

5. The system of claim 4 in which said first control means further includes
pitch rate sensor means for providing a pitch rate signal representative of the pitch rate of said aircraft, and
further combining means coupled between said limiter means and said servo means for combining said pitch rate signal with the output signal from said limiter means.

6. The system of claim 5 in which said first control means further includes integrator means responsive to said pitch attitude error signal for applying the integral thereof to said servo means.

7. The system of claim 6 in which said limiter means, said pitch rate sensor means and said integrator means are in respective displacement, rate and integral signal paths with respective gains associated therewith in such a manner that said aircraft asymptotically captures said predetermined climb pitch attitude.

8. The system of claim 4 in which said second control means further includes additional limiter means coupling said pitch attitude error signal to said first control means for limiting said pitch attitude error signal to a predetermined maximum amplitude, whereby to limit the authority of said pitch control surface means controlled thereby to a predetermined fraction of the total authority thereof.

* * * * *